Patented Sept. 7, 1954

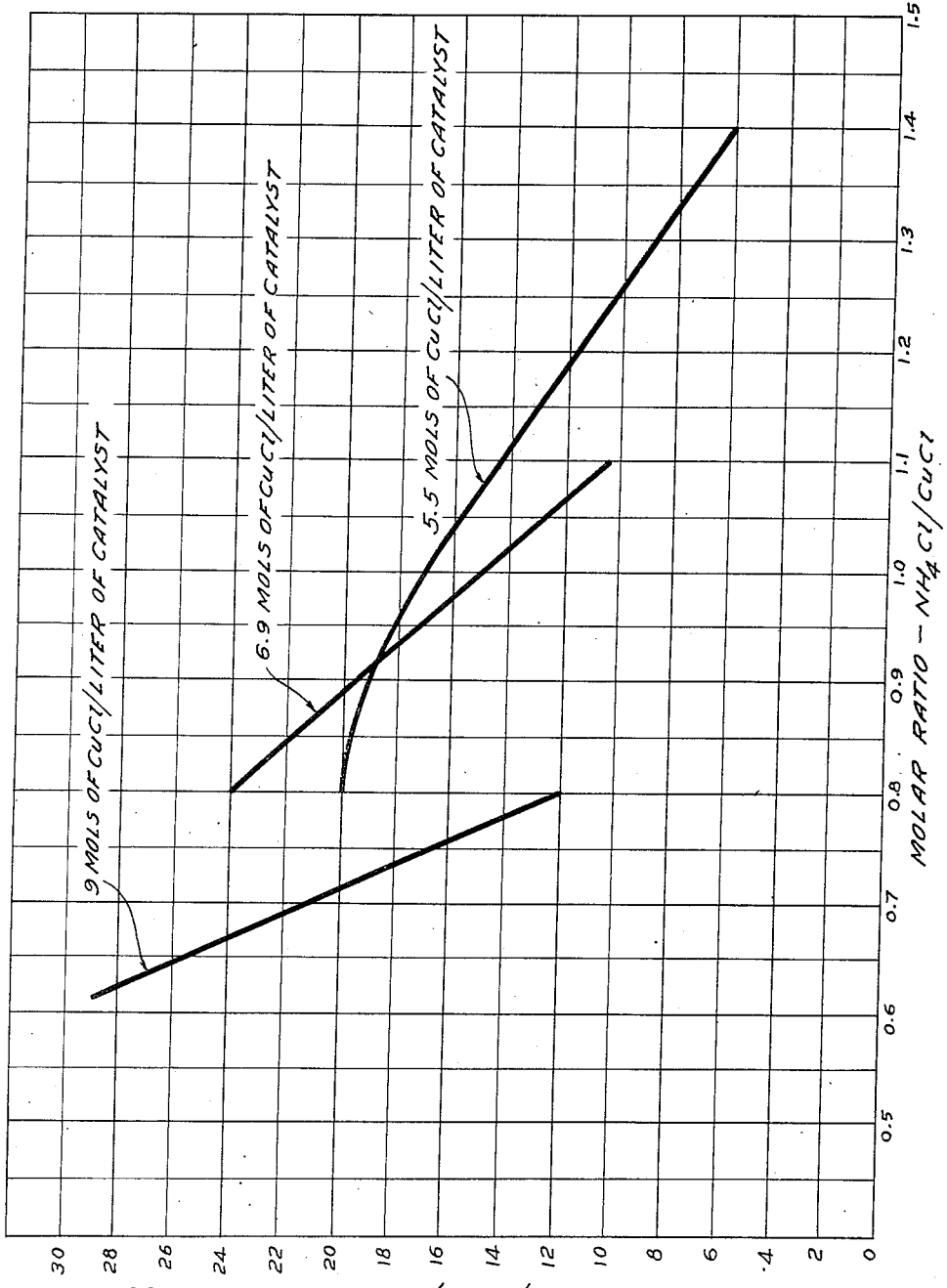

2,688,632

UNITED STATES PATENT OFFICE 2,688,632

CATALYTIC PROCESS FOR PRODUCING ACRYLONITRILE

Erwin L. Carpenter, Stamford, and Johnstone S. Mackay, Old Greenwich, Conn., assignors to American Cyanamid Company, New York, N. Y., a corporation of Maine Application February 8, 1951, Serial No. 210,080

8 Claims. (Cl. 260—465.3)

The present invention relates to the production of acrylonitrile, and more particularly to an improved method for the catalytic production of acrylonitrile from acetylene and hydrocyanic acid.

According to Kurtz, U. S. Reissue 23,265, acrylonitrile is obtained by bringing acetylene together with hydrocyanic acid into contact with an aqueous acid reacting solution of cuprous chloride, said solution containing also a salt of the class consisting of ammonium and alkali metal chloride salts which functions as a solubilizer for the cuprous chloride. The acid reaction of the catalyst solution is attained by the patentee by adding a strong acid such as hydrochloric acid, hydrobromic acid, sulfuric acid or phosphoric acid and it is preferable to adjust the pH to about 6.0. However, a catalyst having an acid reaction down to 0.0 or lower, may also be employed. It is advantageous according to the patentee to add copper powder to the catalyst in order to maintain the copper salt in the monovalent state. A typical example in the patent of the catalyst composition (parts being by weight) is 300 parts of cuprous chloride, 100 parts of ammonium chloride, 5 parts of concentrated hydrochloric acid, 10 parts of copper powder and 400 parts of water. The reaction may be carried out at temperatures between 0–200° C. but it is preferable to hold the temperature at about 80° C. when working under atmospheric pressure. We prefer to operate at from 80° to 90° C. It is advantageous to work with an excess of acetylene, and we may use as high as 10 parts of acetylene to one part of hydrocyanic acid or even higher.

We have found that the activity (rate of production of acrylonitrile) of the catalyst solution in the Kurtz process disclosed above varies inversely with the amount of ammonium chloride in the solution. In other words, excess ammonium chloride (an amount over and above that required to solubilize the cuprous chloride) lessens the capacity of the catalyst to produce acrylonitrile.

We have further found that during the operation of the cuprous chloride catalyst solution, ammonium chloride is constantly being formed and as it accumulates the activity of the catalyst gradually diminishes.

The drawing represents graphically the decreasing rate of production of acrylonitrile from hydrocyanic acid and acetylene in an acid cuprous chloride solution containing ammonium chloride, as the ratio of ammonium chloride to cuprous chloride increases, regardless of the molar concentration of copper in the solution.

It is believed that the following side-reaction takes place during the operation of the cuprous chloride catalyst solution, and hence account for the formation of the ammonium chloride and the accompanying loss in activity of the catalyst.

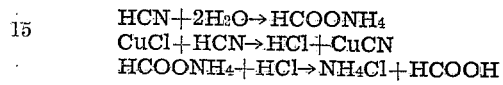

$HCN + 2H_2O \rightarrow HCOONH_4$
$CuCl + HCN \rightarrow HCl + CuCN$
$HCOONH_4 + HCl \rightarrow NH_4Cl + HCOOH$ It has now been discovered that the cuprous chloride catalyst solution can be operated at initial or optimum activity by periodically withdrawing a portion of the solution, and adding copper chloride to the solution, as such or as its equivalent, the amount of copper in each of the steps being substantially the same, to keep the ratio of total ammonium chloride to total copper chloride substantially at the initial ratio. The above steps may be carried out in reverse order if desired. By operating in this manner, an amount of the ammonium chloride which is being constantly formed in the catalyst solution is periodically removed, and an amount of copper equal to that withdrawn is restored, thus substantially maintaining the initial ratio of ammonium chloride to copper chloride. The volume of the catalyst solution is held substantially uniform by either adding an amount of water or steam, or by adding the copper compound in an aqueous suspension or solution.

The restored copper compound may be added to the catalyst solution as a solid, an aqueous suspension or solution, and may be such copper compounds as cupric or cuprous chloride, cupric acetate, cupric formate, cuprous cyanide, cupric or cuprous carbonate, cupric cyanate, cupric or cuprous oxide, or cupric or cuprous hydroxide.

The data given in Table 1 illustrates the effect of increase in molar ratio of ammonium chloride to cuprous chloride on the activity of the catalyst. The recorded activity of each run represents the rate of production of acrylonitrile per hour per liter of catalyst solution averaged over a period of approximately 20 hours.

TABLE 1

| Example No. | CuCl conc., mols/liter | NH₄Cl/CuCl, mol ratio | Grams of acrylonitrile produced/hr./liter |
|---|---|---|---|
| 1A | 5.5 | 0.85 | 19.6 |
| 1B | 5.5 | 1.00 | 17 |
| 1C | 5.5 | 1.20 | 11 |
| 1D | 5.5 | 1.40 | 6 |
| 2A | 6.9 | 0.80 | 24 |
| 2B | 6.9 | 0.91 | 18.5 |
| 2C | 6.9 | 1.10 | 10.4 |
| 3A | 9.0 | 0.61 | 29 |
| 3B | 9.0 | 0.70 | 21 |
| 3C | 9.0 | 0.80 | 12 |

The above data which is shown graphically in the accompanying drawing further illustrates the importance of operating with a low molar ratio of ammonium chloride to cuprous chloride with a given cuprous chloride concentration.

It is interesting to note in Table 1 and the drawing that the higher the concentration of cuprous chloride in the catalyst solution, the less the ratio of ammonium chloride to cuprous chloride required for optimum production of acrylonitrile.

In Tables 2 and 3, the build-up of the ratio of ammonium chloride to cuprous chloride is shown as a natural result of the process with the consequent lowering of acrylonitrile produced.

TABLE 2

| Example No. | CuCl conc., mols/liter | NH₄Cl/CuCl, mol ratio | Lbs. of acrylonitrile produced per 24 hours |
|---|---|---|---|
| 4 | 6.9 | 0.86 | 682 |
| 5 (2 days later) | 6.9 | 0.89 | 600 |

TABLE 3

| Example No. | CuCl conc., mols/liter | NH₄Cl/CuCl, mol ratio | Lbs. of acrylonitrile produced per 24 hours |
|---|---|---|---|
| 6 | 6.9 | 0.89 | 610 |
| 7 (9 days later) | 6.9 | 0.94 | 415 |

To illustrate the maintenance of optimum acrylonitrile production through periodic removal of catalyst solution containing excess ammonium chloride and addition to the catalyst body of an amount of copper equivalent to that removed, the following example is submitted:

*Example 8*

100 gallons of catalyst were made up containing 558 lbs. of cuprous chloride, 257 lbs. of ammonium chloride, 470 lbs. of water and sufficient hydrochloric acid to give a pH of about 1.0. This catalyst has a mol ratio of ammonium chloride to cuprous chloride of 0.85:1. Approximately 470 lbs. of hydrocyanic acid and 590 lbs. of fresh acetylene were fed to the catalyst per day together with 4100 lbs. of recycled acetylene. The catalyst solution was maintained at approximately 90° C. The recycled acetylene was in excess of that required to react with the hydrocyanic acid to form acrylonitrile. About 200 cc. of catalyst solution were removed per hour and an amount of cupric chloride added equal to the amount of copper removed. At the start of the process, 722 lbs. of acrylonitrile were being produced per day. By repeating the removal and addition every hour, at the end of 41 days 712 lbs. of acrylonitrile were being produced per day, thus showing the effectiveness of maintaining the ratio of ammonium chloride to cuprous chloride substantially constant. The volume of the catalyst solution was kept uniform by adding the cupric chloride in aqueous solution. It is to be noted that there were also periodic additions of hydrochloric acid so as to keep the pH well on the acid side.

On the other hand, if no attempt is made to maintain the ratio of ammonium chloride to cuprous chloride substantially uniform, the production rate of acrylonitrile drops sharply as indicated in Tables 2 and 3.

It will be apparent from an inspection of the drawing, that the present discovery is not dependent upon the concentration of copper chloride in the catalyst solution. Therefore, one may start with a catalyst solution containing an amount of ammonium chloride solubilizer sufficient to keep in solution whatever amount of cuprous chloride is initially used. The principal criterion in maintaining the production rate uniform is that the excess ammonium chloride formed during the course of the reaction is removed before the production rate has been permitted to drop too much and to resupply the body of the catalyst with copper in an amount approximately equivalent to that removed.

Where the catalyst solution is to be used over long periods of time by constant removal and addition, it is desirable to also make additions of hydrochloric acid where required to maintain the acidity at the desired point, to wit, at a pH of 6.0 or lower.

It will also be apparent that regardless of the solubilizer initially used, that is, whether it is ammonium chloride or an alkali metal chloride, ammonia is still produced as a side reaction and it is this production which it is believed is responsible for a lessening of the acrylonitrile formed in the process.

While the invention has been described with particular reference to specific embodiments, it is to be understood that it is not to be limited thereto but is to be construed broadly and restricted solely by the scope of the appended claims.

We claim:

1. In a continuous process for production of acrylonitrile which comprises reacting acetylene with hydrocyanic acid in the presence of an aqueous acidic catalyst solution containing cuprous chloride and a cuprous chloride solubilizer in amount not substantially greater than that required to solubilize the cuprous chloride, said catalyst solution being maintained at an acid pH by periodic addition of hydrochloric acid, and said reaction producing ammonium chloride thus increasing the mol ratio of solubilizer to cuprous chloride in the catalyst solution, the method of maintaining the rate of acrylonitrile production substantially constant which comprises periodically withdrawing a sufficient portion of catalyst solution whereby the amount of solubilizer in the retained catalyst solution is not substantially greater than that originally present, and adding a copper compound to the retained catalyst solution in amount at least substantially as great as that contained in the withdrawn portion of catalyst solution, thereby continuously maintaining the solubilizer-cuprous chloride mol ratio substantially no greater than the original ratio.

2. A continuous process of producing acrylonitrile which comprises reacting acetylene with hydrocyanic acid in the presence of an aqueous acidic catalyst solution comprising cuprous chloride and a solubilizer in amount not substantially greater than that required to solubilize the cuprous chloride; periodically adding hydrochloric acid to said catalyst solution to maintain an acid pH; maintaining the rate of acrylonitrile production substantially constant by periodically adjusting the solubilizer-cuprous chloride mol ratio of the catalyst solution so as to continuously maintain it substantially no greater than the original ratio; and collecting product acrylonitrile.

3. The method of claim 1 in which the step of addition precedes the step of withdrawal.

4. The method of claim 1 in which the added copper compound is cuprous chloride.

5. The method of claim 1 in which the added copper compound is cupric chloride.

6. The method of claim 1 in which the added copper compound is cupric acetate.

7. The method of claim 1 in which the added copper compound is cuprous cyanide.

8. The method of claim 1 in which the catalyst solution is maintained at a pH of from 0.0 to 4.0 through addition of hydrochloric acid.

References Cited in the file of this patent

UNITED STATES PATENTS

| Number | Name | Date |
|---|---|---|
| 2,385,327 | Bradley et al. | Sept. 25, 1945 |
| 2,385,469 | Salley | Sept. 25, 1945 |
| 2,417,068 | Farlow et al. | Mar. 11, 1947 |
| 2,422,859 | Schulze et al. | June 24, 1947 |
| 2,423,318 | Howk | July 1, 1947 |
| 2,442,040 | Foster | May 25, 1948 |
| 2,476,771 | Salzberg | July 19, 1949 |

FOREIGN PATENTS

| Number | Country | Date |
|---|---|---|
| 217,478 | Switzerland | Feb. 2, 1942 |
| 223,535 | Switzerland | Dec. 1, 1942 |

OTHER REFERENCES

Hasche et al.: Fiat Final Report No. 836, pages 7–11 (1946).

Carter: Fiat Final Report No. 1025, pages 1–2 (1947).